Dec. 5, 1939.   H. P. DOUD ET AL   2,181,967
BRAKE EQUALIZER
Filed Nov. 12, 1938   2 Sheets-Sheet 1
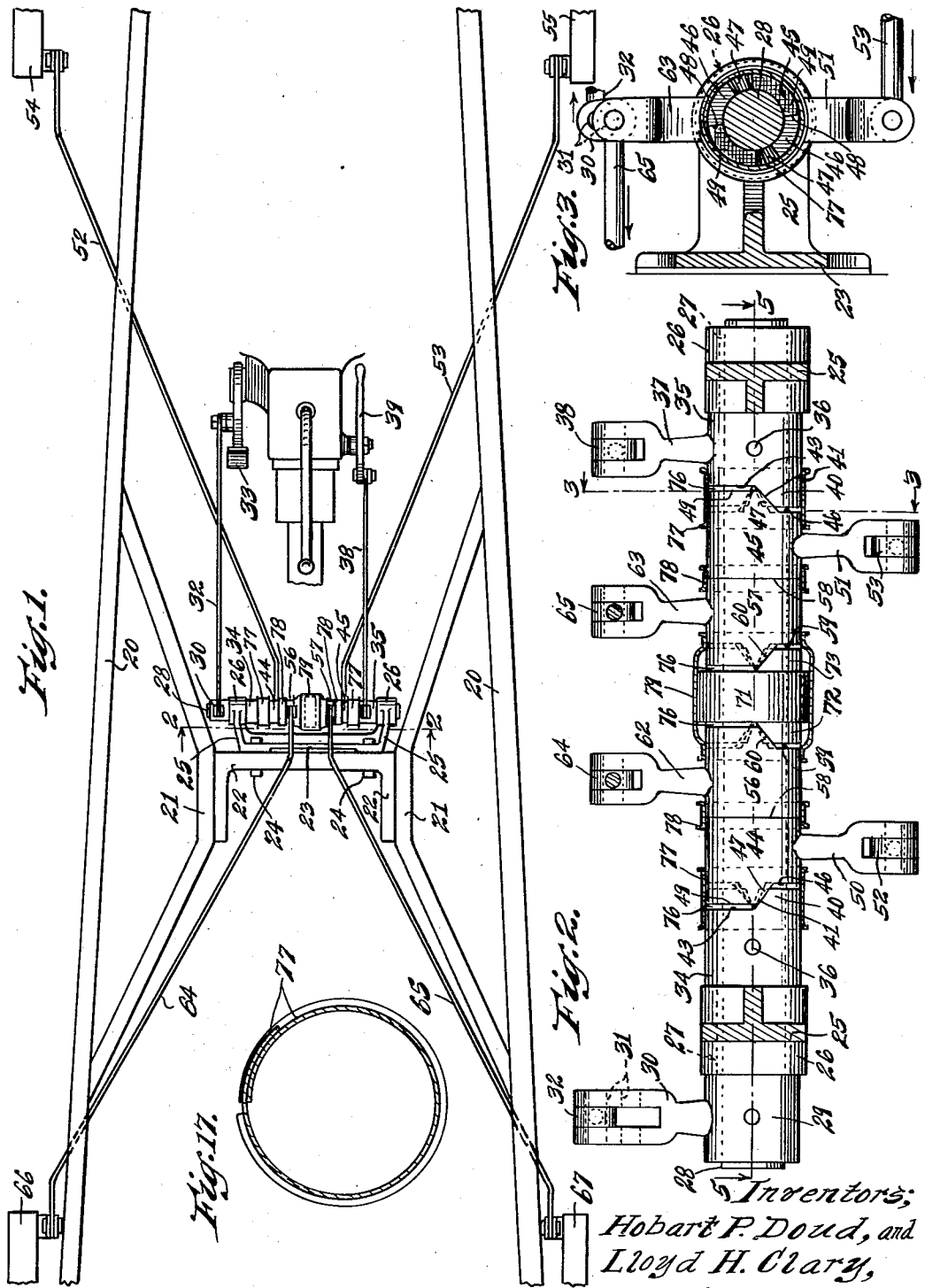
Inventors:
Hobart P. Doud, and
Lloyd H. Clary,
By Joshua R. H. Potts
Their Attorney.

Dec. 5, 1939.  H. P. DOUD ET AL  2,181,967
BRAKE EQUALIZER
Filed Nov. 12, 1938  2 Sheets-Sheet 2
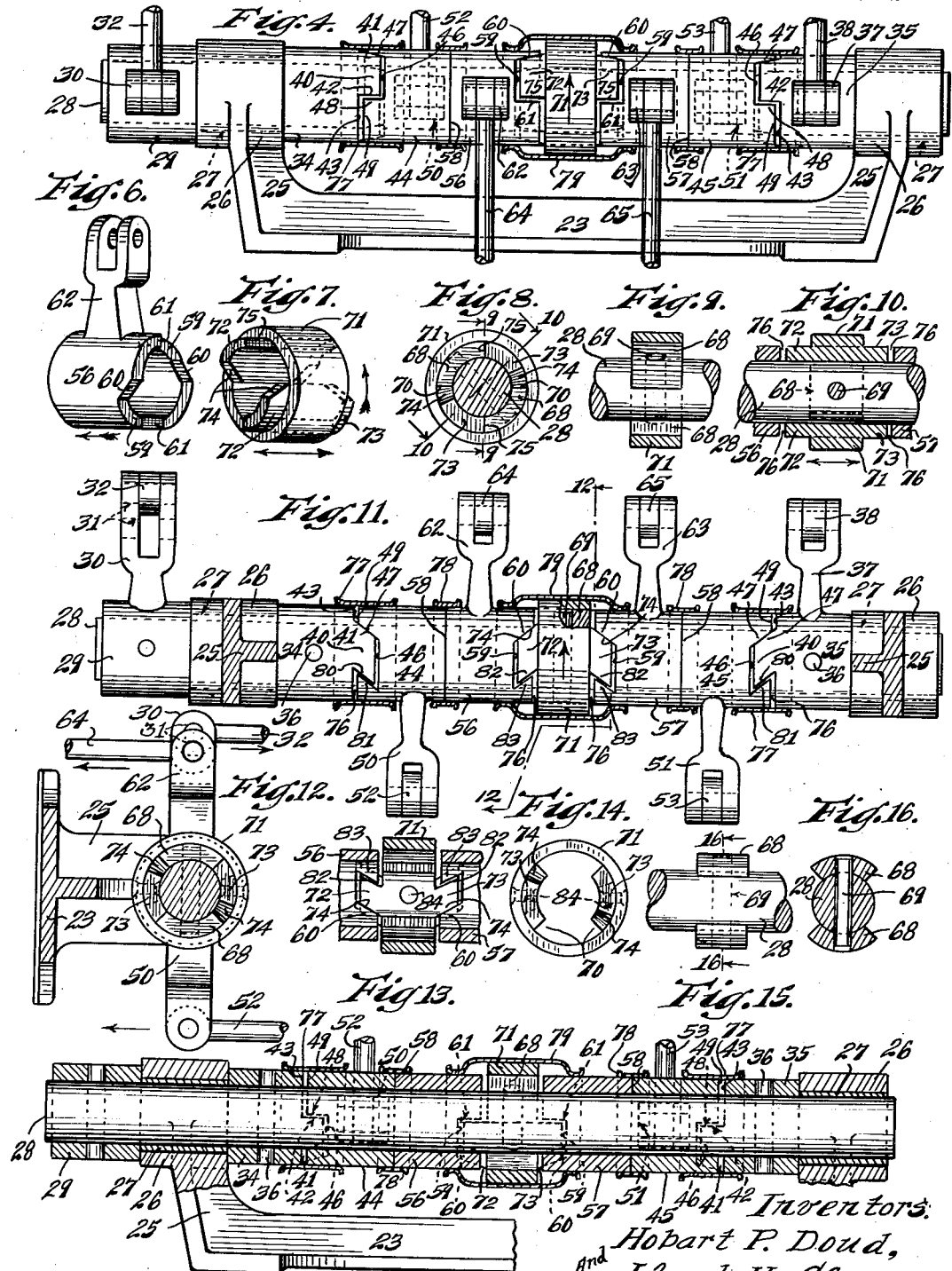
Witnesses:
Inventors:
Hobart P. Doud,
Lloyd H. Clary,
By Joshua R. H. Potts
Their Attorney.

Patented Dec. 5, 1939

2,181,967

UNITED STATES PATENT OFFICE 2,181,967

BRAKE EQUALIZER

Hobart P. Doud and Lloyd H. Clary, Decatur, Ill.

Application November 12, 1938, Serial No. 240,058

15 Claims. (Cl. 188—204)

This invention relates to tension or brake equalizers for devices where a load is applied from one member to each of several or a plurality of members of a mechanism so as to equalize the applied tension, movement or load, and effectively compensate for any differential existing in the parts due to loose, broken or displaced connections, wear, variances in adjustment, or other inequalities, so that a uniform action will be effected on each of said several members.

Specifically, the invention, while not so limited in its use, is particularly adapted for application and use in connection with vehicle brakes and especially the brakes of automobiles, although capable of application in principle to railroad rolling stock.

A further object of the invention is to provide a novel, simple and inexpensive equalizer for automobile brakes, either two or four wheel, and to a unit or mechanism to equalize the braking action or load on the brakes of all wheels and especially mechanical brakes, whereby equal and uniform brake pressure to check the movement and momentum of the automobile or other vehicle will be applied to or exerted on all opposed sets or pairs of brakes by a minimum of applied pressure or expenditure of energy, and at the same time uniformly compensate for any lack of uniformity or inequality of action of the brakes and the shoes against the drums or of the connections between the brake rod or pedal and the brakes themselves, and which in case of looseness, disconnection or breakage of any parts, such as connecting or brake rods, which might render certain of the brakes ineffective or partially so, will so distribute or equalize the braking pressures on the other brakes that the vehicle can be safely and effectively brought to a stop, slowed, or the speed checked, as traffic conditions may require, and without side skid or endangering the occupants or other vehicles, traffic or pedestrians.

Still another object is to provide a very simple mechanical brake equalizer for automobiles which can be easily applied to vehicles already constructed or initially with little cost for parts or labor in applying and connecting the same, as well as with but slight modification, and which also operates in conjunction with the usual foot operated service brake pedal or foot lever, and the emergency brake lever.

A still further object is to provide a brake equalizer of the character set forth which constitutes a simple unit assembly capable of application to the chassis frame and which can be easily applied or mounted in position for convenient connection to the brake levers and rods, and which is protected or guarded against the collection of dirt or foreign elements hindering the working mechanism.

Other objects and advantages will appear hereinafter and be more fully brought out, reference being had to the accompanying drawings, wherein:

Fig. 1 is a plan view showing parts of the chassis of an automobile with the brake equalizer constituting the subject matter of the present invention applied thereto;

Fig. 2 is an enlarged vertical sectional elevation taken on the line 2—2 of Fig. 1;

Fig. 3 is a transverse vertical section taken on the line 3—3 of Fig. 2;

Fig. 4 is an enlarged plan view of the equalizer unit;

Fig. 5 is a longitudinal sectional view taken on the line 5—5 of Fig. 2;

Fig. 6 is a perspective view of one of the sleeves of the equalizer unit;

Fig. 7 is a perspective view of a floating collar employed in connection with the equalizer;

Fig. 8 is a cross section showing the collar of Fig. 7 in end elevation;

Fig. 9 is a diametrical section taken on the line 9—9 of Fig. 8;

Fig. 10 is a similar view taken on the line 10—10 of Fig. 8;

Fig. 11 is a view similar to Fig. 2 of a modified form of the device;

Fig. 12 is a section taken on the line 12—12 of Fig. 11;

Fig. 13 is a view similar to Fig. 10 of the modified form;

Fig. 14 is an end view of the collar and attached parts with the shaft omitted corresponding to Fig. 8;

Fig. 15 is a fragmentary elevation corresponding to Fig. 9;

Fig. 16 is a sectional view taken on the line 16—16 of Fig. 15; and

Fig. 17 is a sectional view of one of the guard clips.

Referring to the drawings and more particularly to Figs. 1–10, inclusive, there is shown a part of a chassis of an automobile in order to illustrate the application of the device to a vehicle or rolling stock, in the present instance, illustrated as an automobile having the usual frame including longitudinal side bars 20 provided with the usual braces 21 commonly known as the usual X or cross brace for reinforcement purposes, although it is to be understood that any suitable frame structure or underpinning may be employed, but preferably one provided with a transverse brace or connecting member 22 shown extending between the braces 21 and of course properly connected thereto. The equalizer of the present invention is shown especially applied to an automobile with mechanical brakes, that is wherein the braking pressure is applied by connections from the brake pedal or lever rather than through the interpositioning of some fluid transfer element such as used in hydraulic or air brakes, although not limited to such application. It comprises a mounting or base plate 23 disposed vertically or otherwise but shown secured in such vertical position against the front of the cross brace or transverse connecting member 22 as by bolts or the like 24. Of course, the cross brace may be equipped originally with bearings instead of using a separate plate, the latter being particularly desirable when applied to cars already constructed. The mounting member or base plate 23 is provided at its ends with bearing arms 25 shown extending forwardly and having bearing sleeves 26 at their free ends, these sleeves 26 being provided with suitable babbit or brass bushings 27, although other suitable bearings or antifriction members may be employed. Journaled in the bearings is a shaft 28 suitably held against axial movement or translation such as by sleeves on opposite sides of certain of said bearings, as it is thought will be obvious and as now will be described. A sleeve 29 is fixed to the shaft 28 in any suitable way by a cross pin, key or otherwise and has a forked arm 30, the tines or branches of which are preferably provided with a plurality of holes 31 for connection with a brake or link rod 32 connected to the service brake lever or foot pedal 33 suitably mounted as customary. Collars 34 and 35 are also fixed to the shaft 28 immediately inside of the bearings 26 and are in the form of sleeves or other suitable form producing operating members in conjunction with the other parts of the equalizer unit as will be apparent as the description proceeds. These collars may be fixed to the shaft in any suitable way as is the sleeve 29 and are shown connected thereto by pins 36. The sleeve or collar 35 is provided with a forked arm 37 to which a brake or link rod 38 is pivotally connected and in turn connected to the emergency brake lever 39 which, like the service brake lever or foot pedal, is simply mounted according to standard practice.

Each of the collars or sleeves 34 and 35 is provided with a lateral lug 40 but extending in opposite directions inwardly and conforming to the arc of its respective collar. Each lug or sloping projection has a diagonally and spirally formed beveled portion or edge 41 and a right angular or release shoulder 42 at the opposite ends of the respective lugs, the purpose of which will subsequently appear. The circumferential portions 43 between the beveled or sloping portions 41 and the shoulder portions 42 disposed axially and radially or diametrically at their edge portions with respect to the axis of the shaft, are disposed at right angles to the axis and to the shoulders 42 and each lug extends one-fourth the way around the circumference or an area or arc of ninety degrees, although any other suitable arrangement may be employed. However, with this construction, the desired strength is provided and a uniformity of arrangement as well as facility in manufacture is provided for.

Collars 44 and 45 are loosely mounted on the shaft 28 immediately within the collars 34 and 35 respectively and each has a notch or recess 46 conforming to the shape of the lugs 40 and having beveled edges 47 and end shoulders 48 as well as edge portions 49 extending circumferentially and opposing the beveled spiral portions 41, the shoulders 42, and the edge portions 43 respectively, of the lugs 40, but so formed as to allow slight play or lost motion therebetween which in ordinary standard brake practice would be approximately one-sixteenth of an inch or slightly less, and collars 34 and 35 by reason of being fixed to the shaft 28 limit the relative movement between the collars as clearly shown in the drawings. The opposing shoulders 42 and 48 serve to release the brakes and return the parts to normal positions when the brake pedal is released.

As before mentioned, the beveled edge portions or walls 41 and 47 are cut spirally so as to follow the curvature of the sleeves or collars and shaft and substantially at an angle of forty-five degrees to the axis as well as radially relative to the thickness thereof and these walls contact so as to slide relatively and impart axial movement to the respective sleeves or collars 44 and 45 as will be subsequently described. Forked arms 50 and 51 are extended downwardly from the respective right and left hand collars 44 and 45 as distinguished from the diametrically aligned upwardly extending positions of the arms 30 and 37 and are pivotally connected by link rods 52 and 53 respectively with the actuating levers of the front brakes 54 and 55 having the usual drums, bands, and other standard structure for checking the momentum of the vehicle.

Immediately within the collars 44 and 45 are other collars 56 and 57 having smooth outer faces normal to the axis thereof and of the shaft opposing smooth faces on the inner ends of the collars 44 and 45 as shown at 58. The collars 56 and 57 have recesses 59 corresponding to the notches or recesses 46, as well as beveled faces 60 and right angular end shoulders 61 corresponding to the walls 41 and 47 and shoulders 42 and 48 respectively, said shoulders as well as the shoulders 42 and 48 serving as stops or release means to cause the collars or sleeves to return to neutral spaced relation when the brake pedal or lever is released or returned to inoperative position to release the brakes. Similar forked arms 62 and 63 are provided on and extend upwardly from the inner collars 56 and 57 and are connected by link rods 64 and 65 respectively to the rear brakes 66 and 67 for the purpose of actuating the same, as is customary. Thus, it will be noted that the arms 62 and 63 are positioned within the arms 50 and 51 and while the arm 37 is shown positioned at the end opposite to the position of the arm 30, the latter arm may be provided with a double fork or otherwise suitably constructed to permit connection of the emergency brake lever and associated parts thereto, where the emergency brake is located at the left part of the chassis instead of to the right of the transmission or in the center.

A pair of diametrically opposite guide lugs 68 are rectangularly formed and pinned, welded, riveted, formed integral or otherwise fixed or keyed to the shaft 28 as shown at 69 and are arcuate to fit the contour of the periphery of the shaft and fit within guide slots 70 of an intermediate or central floating collar 71 of uniform linear dimension throughout its circumference. This collar has oppositely projecting lugs 72 and 73 extending from opposite sides thereof within the inner surface of the collar in the same circle or plane as the collars previously described so as to fit edgewise against the collars 56 and 57 and these lugs are secured in position by welding, pinning or by being formed integral with the collars or otherwise. The lugs 72 and 73 have beveled portions 74 opposing the beveled portions 60, and shoulders 75 opposing the shoulders 61, the spaces 76 between the faces or play between the parts in a neutral position being indicated so that with approximately one-sixteenth of an inch play at each of the four points specified, a total play of about one-fourth of an inch is provided for. It should be noted that the lugs 72 and 73 project from opposite sides of the collar 71 and are guided between the lugs 68 so that the collar must shift axially on the shaft in either direction and the edges formed as a continuation of the shoulders 75 serve as guiding means against the ends or longitudinal edges of the lugs 68 during such movement with respect to the diametrically opposed pairs of lugs. Incidentally, it may be mentioned that while each lug occupies an arc of substantially ninety degrees on the shaft and the respective collar, this is not absolutely essential as other suitable arrangement or extension instead of one-fourth of a circumference may be employed. However this construction gives considerable strength to the lugs although no excessive strain is really essential to actuate the brakes operating in good order to check the momentum or stop a vehicle.

In order to protect the parts of the equalizer and the joints between the collars and opposed beveled coacting faces or edges thereof so as to guard against the entrance of dirt or other foreign matter which might hinder working thereof when properly lubricated, a plurality of coverings are provided shown in the form of metal clips or guards, the outer ones of which are designated at 77 with out-turned edges and overlapping ends as shown in Fig. 17. These guards cover the joints between the collars 34 and 44 and 35 and 45, while similar clips 78 cover the joints between the collars 44 and 56 and 45 and 57 respectively. A central clip 79 which is slightly convex to embrace the collar 71, covers the joints between the collars 56 and 71 and 57 and 71, the ends of the clips being sufficiently spaced from the forked arms at all points corresponding to the play or loose motion between the collars or sleeves to permit shifting of the latter in the operation of the device in applying and releasing the brakes on opposed pairs of wheels and equalizing the action thereof. It will also be noted that the lugs of the collars at each side of the longitudinal center are disposed in opposite relation and each series of lugs upon opposite positions, the shoulders being arranged axially or spirally to cause the parts to shift easily and smoothly.

In the construction shown in Figs. 11-16, inclusive, the arrangement is the same as that already described in connection with Figs. 1-10, inclusive, and Fig. 17, except that the shoulders 42, 48, 61 and 75 are extended at a spiral angle parallel to the beveled portions 41, 47, 60 and 74 to release in the reverse direction, but with play between the parts as indicated at 76, the shoulders 80 opposing the beveled shoulders 81 at the recesses to give the required release action separating the collars and returning them to neutral positions when the brake lever is released in opposition to the shoulders 82 and 83. In this instance, the lugs 68 instead of being pinned to the shaft, may be otherwise secured thereto and the lugs 72 and 73 which project from opposite sides of the collar 71 may be suitably secured thereto as by rivets 84 instead of being formed integral, welded or otherwise attached thereto.

In the operation of the equalizer with the parts in normal positions when the brakes are unapplied, the collars will be spaced apart at the beveled lugs or extensions provided thereon, this being the neutral position. However, when the brake rod of the vehicle is operated as by actuation of the service brake lever or foot pedal 33 or the emergency lever 39, angular movement or rotation is imparted to the shaft through the medium of the arm or lever 30 or 37 tending to turn the respective arms 50 and 51 in the reverse direction from the arms 62 and 63 owing to the fact that they are positioned upon diametrically opposite sides and above and below the shaft 28 to impart movement to the rods 52, 53, 64 and 65 to apply the brakes 54, 55, 66 and 67. Any lack of uniformity in the setting of the brakes, and particularly the brake bands or any wear thereon or due to looseness of any of the connections between the parts will be uniformly compensated for so that the tension will be equalized on all members or brakes from the load actuating member and an equal and uniform pressure will be exerted on each brake due to the collars 34 and 35 being fixed to the shaft to limit the relative movement between the collars and the coacting opposed beveled lugs or faces of the respective collars acting oppositely upon opposite sides of the floating central collar causing the collars to shift axially on the shaft. This results from the fact that if one connection is loose, a greater amount of movement of its corresponding arm will be required to actuate the same and connected brake shoe than the parts which are relatively tight or in which there is no lost motion or play. This will insure that all of the brakes or actuated members will be equally tensioned and in the case of a vehicle, the effective action of the brakes on opposed wheels will be uniform, thus effectively checking the motion of the vehicle without side sway or skid. While the brakes are preferably adjusted for uniform action, the present device insures against improper braking action in case of looseness or breakage of one or more brake rods or any of the connections of the operative parts to the brakes. Where the parts become disconnected or one brake rod is broken or out of order, the braking pressure will be retained on the remaining ones due to the shifting of the respective collars or levers, which are operative so that the brakes may be effectively applied. This is due to the fact that when pressure is applied to a collar by the brake pedal, it rotates all of the brake drum arms by means of the lugs bearing against the collars as shown and described and causing them to shift accordingly and the device is in the form of a relatively simple unit which can be economically produced and applied to cars as initially constructed or to cars previously constructed and not equipped therewith.

The application is illustrated in connection with brakes which are mechanically operated.

By way of specific example in explaining the operation and action of the device, if the brake rod to the collar 44 was loose, greater movement would be applied to the brake rod 52 and thus brakes 54 and 55 would be uniformly applied, and greater pressure would be applied on the collar 56 and would slide this collar down on the lug of the collar 71 which would in turn move the collar 56 against the collar 44, thereby moving the latter collar up on the lug of the collar 34, thereby tightening the brake rod 52 on the collar 44. In each instance, the total amount of movement and pressure applied to the collars from the actuating means is the same, but the movements and the sum of the pressure applied by the respective collars such as 57 and 45 will always equal that of the corresponding collars 56 and 44 by reason of the floating collar 71 and since this is the case, by means of the previously described compensating arrangement, the pressure on the collar 57 will always equal the pressure on the collar 45 and therefore the pressure on all of the other collars will be correspondingly equal. If the brake rod 53 to the collar 45 should break or become loose, then the pressure on the collar 57 would be equal to the sums of the pressures on the collars 44 and 56 and a braking pressure would therefore be maintained on the brakes. If the collars 57 and 45 should become disconnected, the resistance of the collars 44 and 56 in the process of braking would slide the floating collar 71 against the collars 57 and 45 and this would leave the collars 44 and 56 free to equalize themselves by means of the lugs on the collar 71 and the lugs on the collar 34 so that in each instance effective braking pressure will be applied. When brakes are applied on only two opposed wheels instead of on all four wheels, the respective connections to the wheels not equipped with brakes, may be omitted or the respective collars at the center and lugs for two-wheel brakes together with the function thereof.

It will be understood that, while we have illustrated and described the preferred form of construction for carrying our invention into effect, and the preferred procedural steps for carrying out the novel method, these are capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent, is:

1. In a brake equalizer, a shaft, means mounting the shaft for rotation, collars on the shaft, means for actuating the shaft, certain of said collars having opposed inclined portions coacting with each other, means for connecting certain of said collars with brakes or the like, and means to automatically cause opposite uniform action on said collars and brakes.

2. In a brake equalizer unit, a mounting plate having bearings, a shaft journaled therein, an actuating member connected to the shaft to turn the same, a plurality of shiftable collars on the shaft and an intermediate floating collar between said collars, said collars having opposed oppositely positioned projections and recesses coacting with each other, at least one of said collars being fixed to the shaft and holding the latter against movement axially.

3. In a brake equalizer unit, a mounting plate having bearings, a shaft journaled therein, an actuating member connected to the shaft to turn the same, a plurality of shiftable collars on the shaft and an intermediate floating collar between said collars, said collars having opposed oppositely positioned projections and recesses coacting with each other, the collars on opposite sides of the intermediate collar having projections and recesses opposing the same in opposite directions and the intermediate collar designed to shift longitudinally.

4. In a brake equalizer unit, a mounting plate having bearings, a shaft journaled therein, an actuating member connected to the shaft to turn the same, a plurality of collars on the shaft, certain of said collars being fixed to the shaft, and a central floating collar having projections on each side thereof adapted to engage corresponding recesses of adjacent collars, two or more of said collars being loose on the shaft and having means for connection with brakes or the like.

5. In a brake equalizer unit, a mounting plate having bearings, a shaft journaled therein, an actuating member connected to the shaft to turn the same, a plurality of collars on the shaft, certain of said collars being fixed to the shaft, a central floating collar having projections on each side thereof adapted to engage corresponding recesses of adjacent collars, two or more of said collars having means for connection with brakes or the like, said collars having oppositely inclined coacting portions forming stops and adapted to shift certain of the collars in reverse directions, and cover means over the joints between said collars.

6. The combination in a vehicle having a plurality of wheels and a plurality of brakes, operating means therefor, and coacting beveled equalizing means between said brakes and operating means, said means including a floating member held against rotation relative to said operating means but adapted to shift longitudinally in opposite directions and said beveled means being oppositely beveled and acting in opposite directions.

7. A brake equalizer unit including mounting means, bearings, a shaft mounted to turn in the bearings and held against axial movement, a lever having connection with the shaft to partially turn the same, a plurality of collars on the shaft, certain of said collars being fixed thereto and other of said collars adapted to shift axially, said collars having coacting beveled portions, and a floating collar having oppositely projecting beveled portions coacting with adjacent collars to equalize action on all of the collars, certain of said collars having connection with actuated means.

8. Means for distributing an applied force to a plurality of force receiving devices comprising a plate having bearings, a shaft mounted to turn therein, an arm on the shaft adapted for connection with an operating member, a plurality of collars on the shaft arranged in sets but all cooperative, said collars including inter-fitting projections and recesses between certain thereof, and an intermediate member adapted to move axially in opposite directions to act on said collars in opposite directions, certain of the collars having means for connection with opposed force receiving devices.

9. In a brake equalizer, a plate having bearing arms, a shaft mounted to turn therein against longitudinal movement, an arm on the shaft adapted for connection with an actuating means, a plurality of sets of collars on the shaft, certain of said sets having arms for connection with brakes or other actuated means, coacting faces between certain of the collars having recesses with inclined portions spirally arranged to cause the collars to shift relatively in an axial direction when the shaft is turned for equalizing the action of the arms on the force receiving means or brakes, means to limit the relative movement between said collars and a floating collar between the sets of collars on the shaft between the sets of collars coacting with adjacent collars and having corresponding projections and recesses to cause opposite action on the different sets of collars to equalize the action therebetween and cause uniform action on all brakes irrespective of looseness or lack of uniformity therebetween.

10. In a brake equalizer, a plate having bearing arms, a shaft mounted to turn therein against longitudinal movement, an arm on the shaft adapted for connection with an actuating means, a plurality of opposed sets of collars on the shaft, adjacent collars of adjacent sets having flat faces adjacent each other and certain of said sets having arms for connection with brakes or other actuated means and coacting edges adapted to cause said collars to shift axially when the shaft is partially turned, and means to equalize the actions of the opposed sets of collars in opposite direction.

11. In a brake equalizer, a plate having bearing arms, a shaft mounted to turn therein against longitudinal movement, an arm on the shaft adapted for connection with an actuating means, a plurality of sets of collars on the shaft, certain of said sets having oppositely extending arms for connection with brakes or other actuated means, and means positioned between said sets of collars and coacting therewith to equalize the action on the respective arms, all of said collars of the respective sets having lost motion spaces therebetween.

12. In a brake equalizer unit, a mounting plate having bearings, a shaft journaled therein, an actuating member connected to the shaft to turn the same, a plurality of sets of shiftable collars on the shaft and an intermediate floating collar between opposed collars of an intermediate set having opposed projections and recesses coacting with each other, certain of said projections forming stops and the others being beveled to cause the collars to shift longitudinally when the shaft is turned, certain of said collars being fixed to the shaft and collars of adjacent sets abutting with smooth faces designed to turn relatively.

13. The combination in a vehicle having a plurality of wheels and a plurality of brakes, operating means therefor, coacting beveled equalizing means between said brakes and operating means, said means including a floating member and said beveled means being oppositely beveled and acting in opposite directions and guide means for said floating member holding the same against rotation relative only to the operating means but guiding the same to move in opposite directions.

14. Means for distributing an applied force to a plurality of force receiving devices comprising a plate having bearings, a shaft mounted to turn therein, an arm on the shaft adapted for connection with an operating member, a plurality of collars on the shaft including two fixed collars and arranged in sets with and between said fixed collars, said collars having interfitting projections and recesses opposing each other in each set and adapted to form stops in one direction and to cause the same to shift axially when turned in the opposite direction, and an intermediate floating collar restrained against relative rotation on the shaft, but adapted to move axially in opposite directions to act on said collars in opposite directions, certain of the collars having means for connection with opposed force receiving devices.

15. In a brake equalizer, a plate having bearing arms, a shaft mounted to turn therein against longitudinal movement, an arm on the shaft adapted for connection with an actuating means, a plurality of sets of collars on the shaft, certain of said sets having arms for connection with brakes or other actuated means, coacting faces between certain of the collars having recesses with inclined portions spirally arranged to cause the collars to shift relatively in an axial direction when the shaft is turned for equalizing the action of the arms on the force receiving means or brakes, and a floating collar on a shaft between the sets of collars coacting with adjacent collars and having corresponding projections and recesses to cause opposite action on the different sets of collars to equalize the action therebetween and cause uniform action on all the brakes irrespective of looseness or lack of uniformity therebetween.

HOBART P. DOUD.
LLOYD H. CLARY.